US012200429B2

(12) United States Patent
Zhou et al.

(10) Patent No.: US 12,200,429 B2
(45) Date of Patent: Jan. 14, 2025

(54) MANIFOLD ARCHITECTURE FOR WIND NOISE ABATEMENT

(71) Applicant: Meta Platforms Technologies, LLC, Menlo Park, CA (US)

(72) Inventors: Limin Zhou, Redmond, WA (US); Simon Porter, San Jose, CA (US); Gongqiang Yu, Redmond, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 206 days.

(21) Appl. No.: 18/085,382

(22) Filed: Dec. 20, 2022

(65) Prior Publication Data

US 2023/0345168 A1 Oct. 26, 2023

Related U.S. Application Data

(60) Provisional application No. 63/333,325, filed on Apr. 21, 2022.

(51) Int. Cl.
*H04R 1/10* (2006.01)
*H04R 1/34* (2006.01)

(52) U.S. Cl.
CPC ............. *H04R 1/1083* (2013.01); *H04R 1/34* (2013.01)

(58) Field of Classification Search
CPC ........ H04R 1/1083; H04R 1/34; H04R 5/033; H04R 1/342; H04R 3/005; H04R 2460/13; H04R 1/406; H04R 2410/07
See application file for complete search history.

(56) References Cited

U.S. PATENT DOCUMENTS 5,878,147 A 3/1999 Killion et al.
5,890,072 A * 3/1999 Rabe ....................... H04M 1/03 379/433.03

(Continued)

FOREIGN PATENT DOCUMENTS

CN 213403420 U 6/2021

OTHER PUBLICATIONS

International Search Report and Written Opinion for International Application No. PCT/US2023/019453, mailed Jul. 17, 2023, 13 pages.

*Primary Examiner* — Brian Ensey
(74) *Attorney, Agent, or Firm* — Weaver Austin Villeneuve & Sampson LLP

(57) ABSTRACT

An acoustic device with a manifold architecture is described. The acoustic device includes a primary waveguide and a manifold. The primary waveguide has a first end, coupled to an acoustic sensor, and a second end, a port open to a local area. The port receives airflow from the local area that includes sound pressure waves from a sound source and turbulent pressure waves. The sound pressure waves and a first portion of the turbulent pressure waves are detected by the acoustic sensor. The manifold includes a plurality of waveguides that are coupled to a portion of the primary waveguide between the first end and second end. The plurality of waveguides has openings to the local area. The manifold vents a second portion of the turbulent pressure waves through the openings, and the second portion of the turbulent pressure waves is larger than the first portion of the turbulent pressure waves.

20 Claims, 9 Drawing Sheets

(56) References Cited

U.S. PATENT DOCUMENTS

| | | | | |
|---|---|---|---|---|
| 6,931,143 | B2 * | 8/2005 | Caron | H04R 5/02<br>381/337 |
| 7,260,236 | B2 | 8/2007 | De Roo et al. | |
| 9,357,283 | B2 * | 5/2016 | Darlington | H04R 1/1016 |
| 10,075,783 | B2 | 9/2018 | Howes et al. | |
| 10,893,357 | B1 | 1/2021 | Oishi et al. | |
| 2015/0268673 | A1 | 9/2015 | Farzbod et al. | |

* cited by examiner

MANIFOLD ARCHITECTURE FOR WIND NOISE ABATEMENT

CROSS-REFERENCE TO RELATED APPLICATIONS

This application claims the benefit of U.S. Provisional Application No. 63/333,325, filed Apr. 21, 2022, which is incorporated by reference in its entirety.

FIELD OF THE INVENTION

This disclosure relates generally to acoustic sensors, and more specifically to mitigating wind noise captured by an acoustic sensor.

BACKGROUND

Many systems, such as artificial reality systems, include one or more audio capture devices including one or more microphones that capture audio from an environment surrounding a system. Conventionally, an audio capture device includes a port for a microphone that has an opening exposed to the environment at one end and a microphone positioned at an opening of the port opposite the opening of the port exposed to the environment. In some configurations, the port includes cascaded straight tubes, where an opening of one of the cascaded tubes is exposed to the environment and the microphone is positioned at an opposite opening of another of the cascaded tubes. However, this configuration exposes the microphone to wind noise from moving air in the environment, as wind turbulence energy is captured by the microphone once the wind enters the port for the microphone. The captured wind turbulence energy impairs capture of audio data from the environment.

SUMMARY

An acoustic device includes a manifold architecture to mitigate wind noise. The acoustic device includes an acoustic sensor, a primary waveguide, and a manifold. The primary waveguide having two ends, the first end coupled to the acoustic sensor, and the second end coupled to a port that is open to a local area surrounding the acoustic device. The primary waveguide is configured to direct sound from the local area towards the acoustic sensor. The manifold includes one or more secondary waveguides, one end of each secondary waveguide coupled to a portion of the primary waveguide. The manifold is configured to vent turbulent pressure waves from the primary waveguide away from the acoustic sensor.

Figure 1:
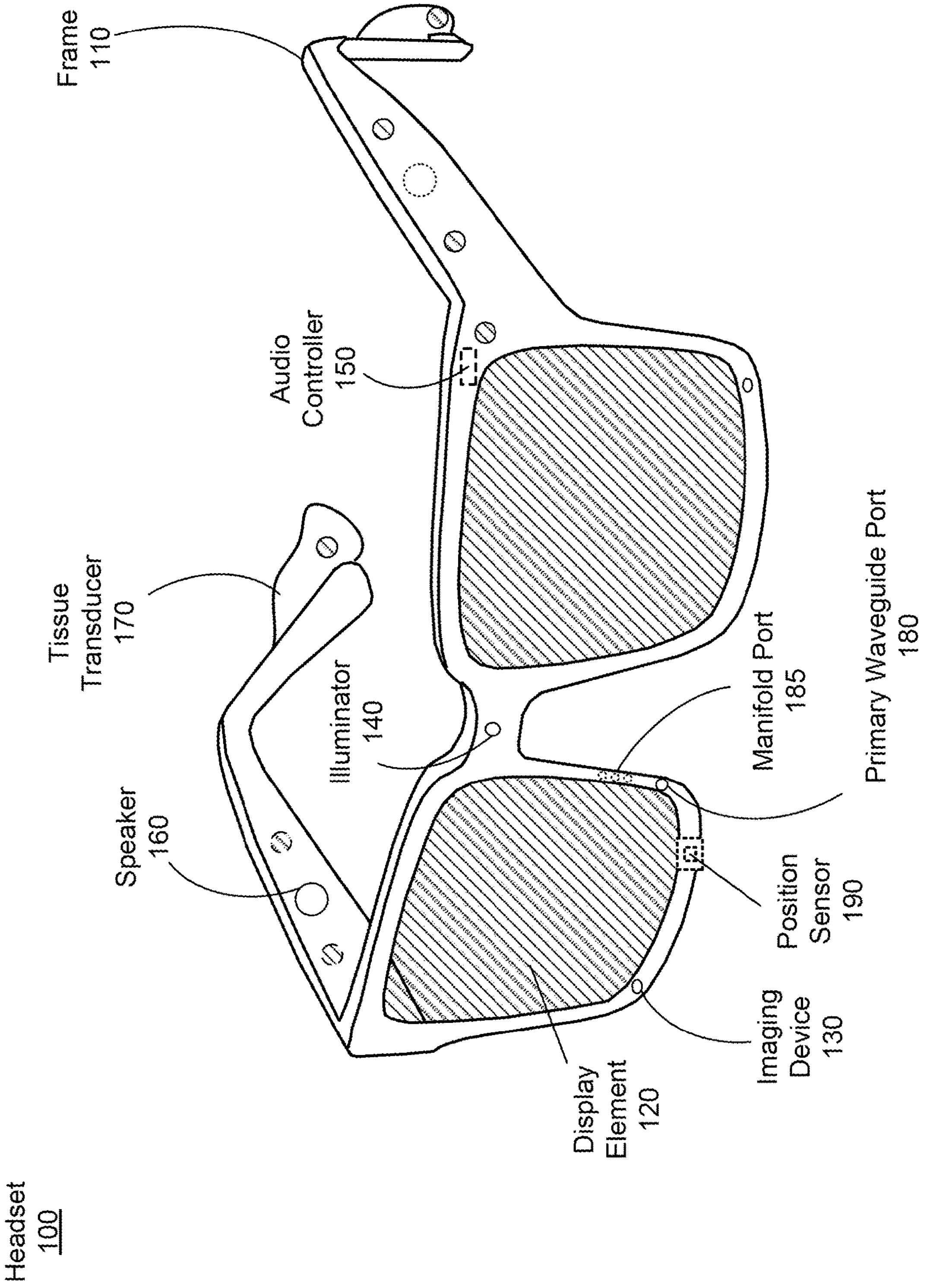
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An acoustic sensor captures sounds emitted from one or more sound sources in a local area (e.g., a room). For example, an acoustic sensor is included in a headset configured to display virtual reality, augmented reality, or mixed reality content to a user. The acoustic sensor is configured to detect sound and convert the detected sound into an electronic format (analog or digital). The acoustic sensor may be acoustic wave sensors, microphones, sound transducers, or similar sensors that are suitable for detecting sounds. In various embodiments, the acoustic sensor is configured to mitigate noise from airflow, such as wind, captured by a microphone. To mitigate noise from airflow, the acoustic device includes a primary waveguide having two ends, the first end including an acoustic sensor, and the second end including a port opened to a local area. A manifold having one or more secondary waveguides, each of the secondary waveguides coupled to the primary waveguide between the first and second end. Each secondary waveguide includes a first and second end, the first end is coupled an internal opening of the primary waveguide, and the second end is a port open to a local area surrounding the acoustic sensor. Airflow is received by the port of the primary waveguide and directed out through the manifold ports. This directs a portion of airflow away from the acoustic sensor coupled to the primary waveguide, mitigating the noise captured by the acoustic sensor from the airflow, while directing audio to the acoustic sensor via the primary waveguide.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1 shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. In various embodiments, the audio system further includes an audio device. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1.

The sensor array detects sounds within the local area of the headset 100. The sensor array includes a plurality of acoustic sensors. An acoustic sensor captures sounds emitted from one or more sound sources in the local area (e.g., a room). Each acoustic sensor is configured to detect sound and convert the detected sound into an electronic format (analog or digital). The acoustic sensors may be acoustic wave sensors, microphones, sound transducers, or similar sensors that are suitable for detecting sounds.

The acoustic device is configured to mitigate noise from airflow, such as wind, captured by an acoustic sensor. As further described below in conjunction with FIGS. 3 through 4, an acoustic device includes a primary waveguide, and a manifold that are coupled to each other. The primary waveguide having a first and second end, the first end coupled to an acoustic sensor configured to capture audio data from the local area surrounding the acoustic sensor, and the second end is a port 180 open to a local area surrounding the acoustic sensor. In some embodiments, the port 180 may include a mesh and/or acoustic membrane. The manifold having one or more secondary waveguides, each of the secondary waveguides coupled to the primary waveguide between the first and second end. Each of the one or more secondary waveguides includes a first and second end, the first end of the secondary waveguide is coupled an internal opening of the primary waveguide, and the second end of the secondary waveguide is a port 185 open to a local area surrounding the acoustic sensor. In some embodiments, one or more port 185 openings may have a mesh and/or acoustic membrane.

In such a configuration, airflow is received by the port 180 of the primary waveguide and directed out through the manifold ports 185, directing airflow from the local area back to the local area. This directs a portion of airflow away from the acoustic sensor coupled to the primary waveguide, mitigating the noise captured by the acoustic sensor from the airflow, while directing audio to the acoustic sensor via the primary waveguide.

In the illustrated example, the acoustic device is located inside the frame of the eyewear device along the right nose pad, with the primary waveguide port 180 located below the manifold ports 185. The primary waveguide port 180 is located close to the bottom of the frame of the eyewear device, to increase the signal-to-noise (SNR) ratio of the audio signal captured by the acoustic sensor. In some embodiments, one or more acoustic devices may be placed on the temples on the eyewear device. In other embodiments, one or more acoustic devices may be placed in an ear canal of each ear (e.g., acting as binaural microphones). In some embodiments, the acoustic device may be placed on an exterior surface of the headset 100, placed on an interior surface of the headset 100, separate from the headset 100 (e.g., part of some other device), or some combination thereof. The number and/or locations of acoustic devices may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 2:
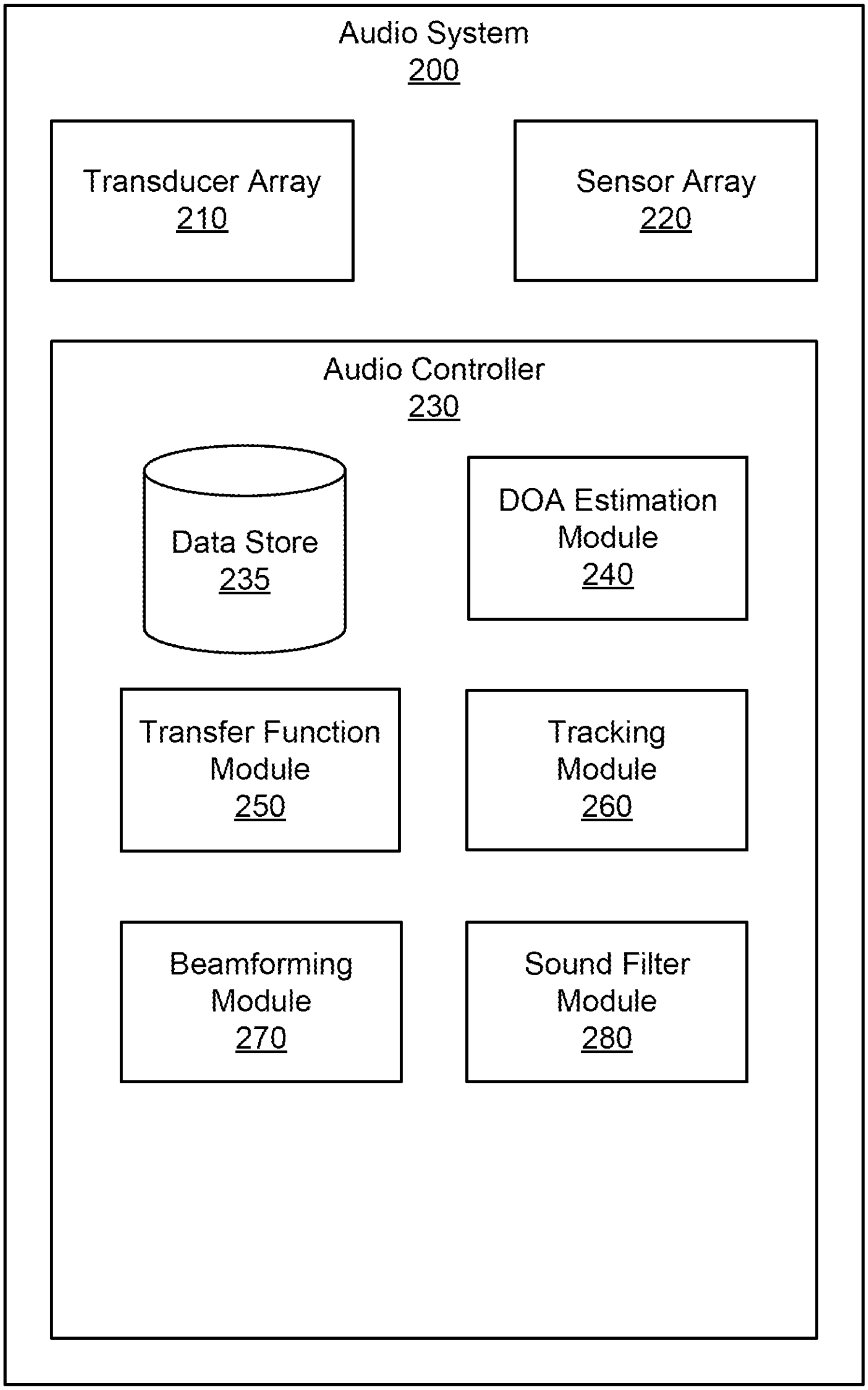
FIG. 2 is a block diagram of an audio system, in accordance with one or more embodiments.

FIG. 2 is a block diagram of an audio system 200, in accordance with one or more embodiments. The audio system in FIG. 1 may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 7).

The sound filter module 280 provides the sound filters to the transducer array 210. In some embodiments, the sound filters may cause positive or negative amplification of sounds as a function of frequency.

Figure 3A:
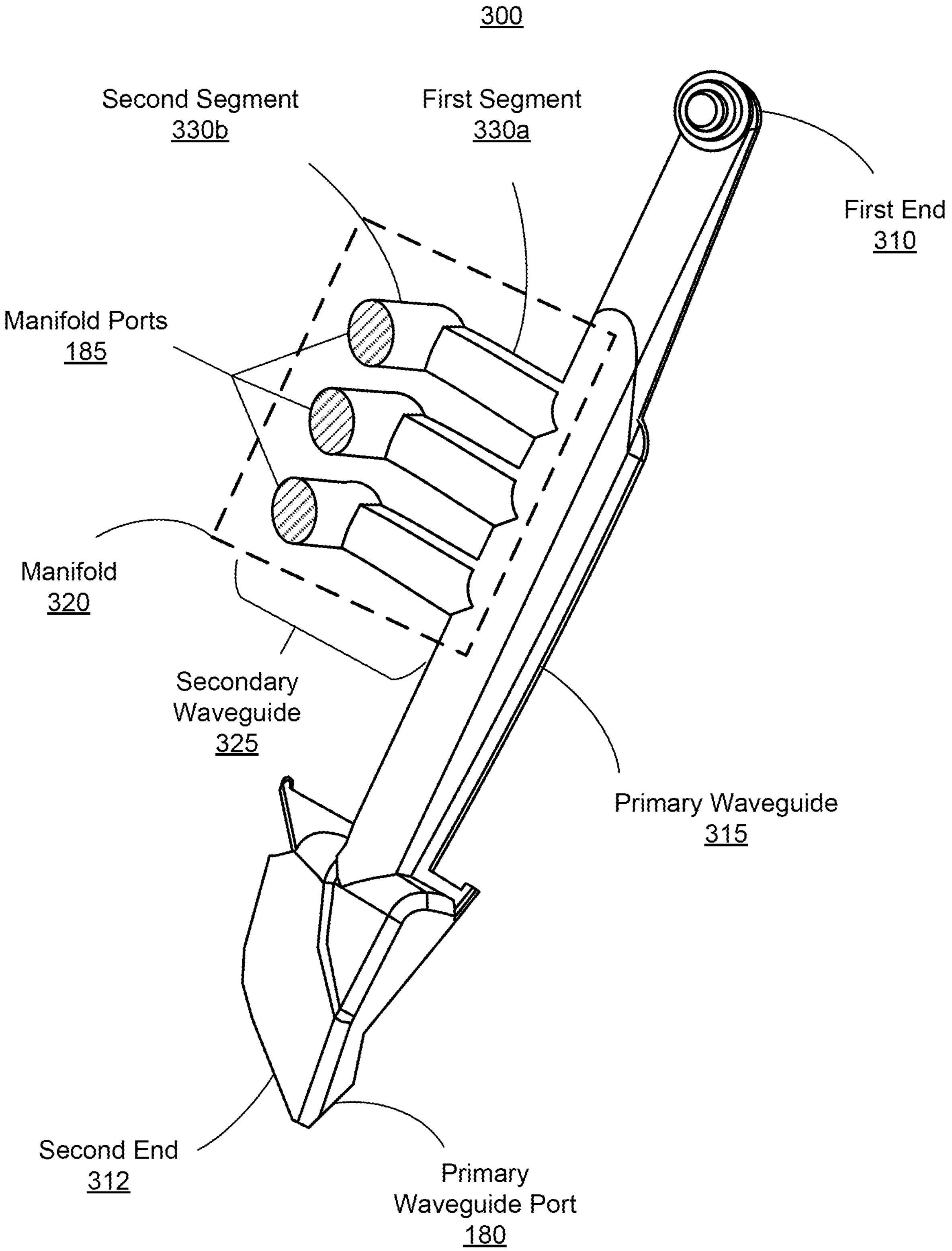
FIG. 3A is a perspective view of an example implementation of an acoustic device using a manifold architecture, in accordance with one or more embodiments.

FIG. 3A is a perspective view of an example implementation of an acoustic device using a manifold architecture, in accordance with one or more embodiments. As discussed above in conjunction with FIG. 1, the acoustic device 300 is coupled to the acoustic sensor in order to mitigate wind noise captured by the acoustic sensor. The acoustic sensor is configured to capture audio content from an environment surrounding the acoustic device 300. The acoustic device includes a primary waveguide 315 and a manifold 320.

In various embodiments, the acoustic device and acoustic sensor are included in a headset 100, as further described above in conjunction with FIGS. 1 and 2. The primary waveguide includes a first end and a second end. The first end 310 is coupled to an acoustic sensor. The second end 312 includes a port 180 that is open to a local area. The port 180 is configured to receive airflow, which may include sound pressure waves from a sound source and turbulent pressure waves, such as wind, from the local area. In some embodiments, the port may include a mesh and/or acoustic membrane.

The manifold architecture is configured to vent a majority of turbulent pressure waves (e.g., wind noise) without venting much, if any, of the sound pressure waves. In this manner, the manifold architecture is able to separate noise (e.g., turbulent pressure waves) from signal (sound pressure waves), and present the signal to the acoustic sensor.

The manifold 320 includes one or more secondary waveguides 325 that are coupled to a portion of the primary waveguide between the first end 310 and the second end 312. For example, the manifold 320 may include three secondary waveguides 325. In other embodiments, the manifold 320 may include any suitable number of secondary waveguides 325. Each of the secondary waveguides 325 includes a first segment 330*a* and second segment 330*b*. The first segment 330*a* of the secondary waveguide further includes a first and second end, the first end coupled to an internal opening of the primary waveguide 315, and the second end coupled to a first end of the second segment 330*b* of the secondary waveguide. The first segment 330*a* of the secondary waveguide is coupled to the primary waveguide 315 such that the first segment 330*a* of the secondary waveguide is at an angle to the primary waveguide 315. For example, in the illustrated embodiment, the first segment 330*a* of the secondary waveguide is coupled to the primary waveguide 315 such that the first segment 330*a* of the secondary waveguide is perpendicular to the primary waveguide 315. It should be noted that the angle may be chosen based in part on mechanical design requirements of the headset 100.

The second segment 330*b* of the secondary waveguide similarly includes a first end and a second end. The first end, as mentioned above, is coupled to the second end of the first segment 330*a* of the secondary waveguide. The second end is a port that is open to the local area. The ports of the plurality of secondary waveguides are collectively referred to as manifold ports 185, illustrated by the shaded ovals. In some embodiments, one or more of the ports of the manifold ports 185 may include mesh and/or acoustic membrane. The second segment 330*b* is coupled to the first segment such that the second segment 330*b* is at an angle to the first segment 330*a*. For example, in the illustrated example, the second segment 330*b* of the secondary waveguide is coupled to the first segment 330*a* of the secondary waveguide such that the second segment 330*b* is perpendicular to the first segment 330*a*.

In FIG. 3A, the secondary waveguides are coupled substantially equidistant from the first end 310 and the second end 312 of the primary waveguide 315. While FIG. 3A shows an example where each secondary waveguide is coupled substantially equidistant from each other, in other embodiments, each secondary waveguides may be coupled to the primary waveguide at any varied distance apart from neighboring secondary waveguides. Additionally, in some embodiments, the secondary waveguides may have a substantially constant cross-sectional area between the first end of the first segment to the port of the second waveguide, while in other embodiments, the secondary waveguides may have a gradually expanded air volume from the first end of the first segment to the port (e.g., horn shape). For example, the secondary waveguides may have a gradually increasing cross-sectional diameter from the first end of the first segment to the second end of the second segment. A total cross-sectional area of the air volume in manifold 320 is greater than a cross-sectional area of the primary waveguide.

Figure 3B:
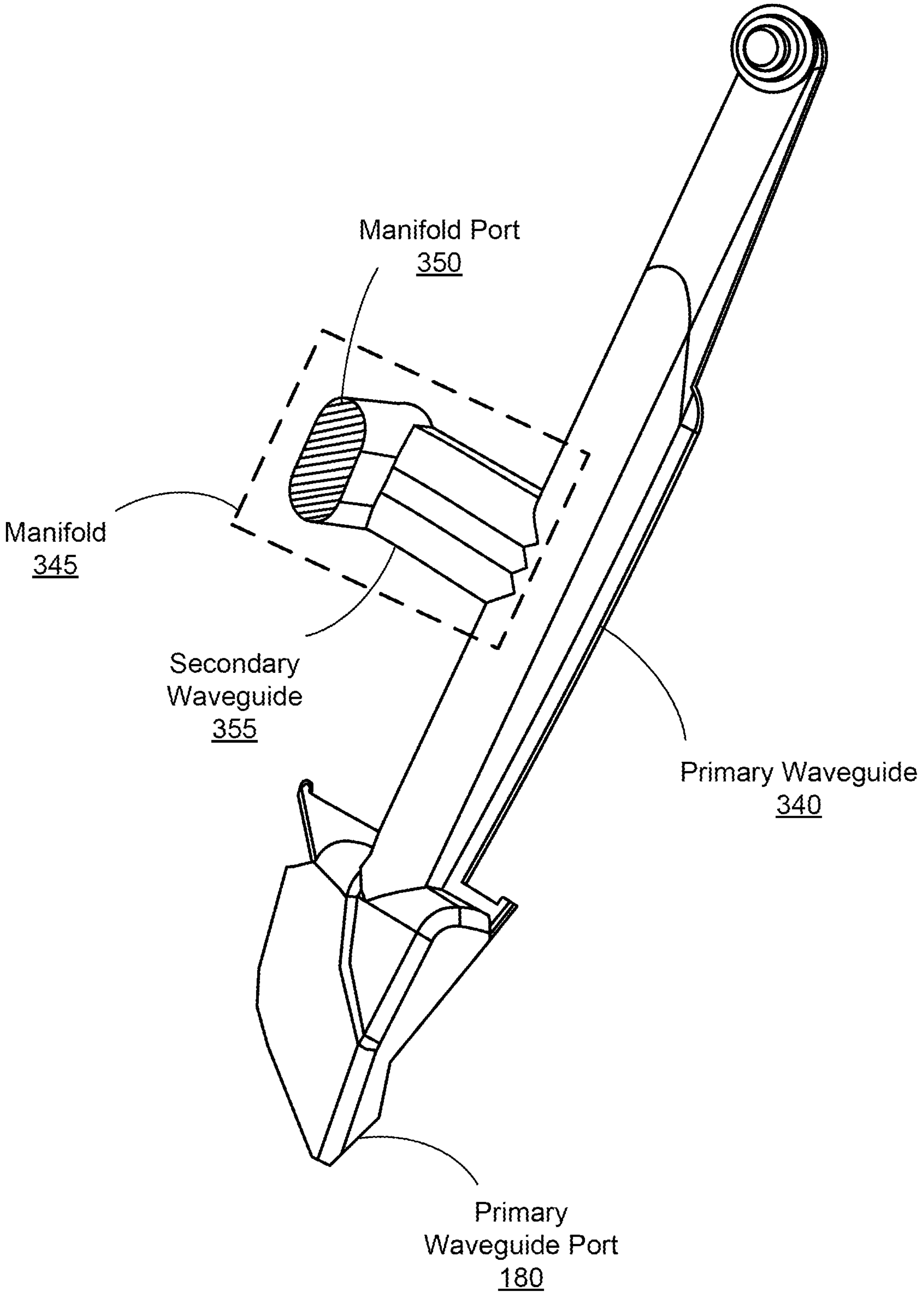
FIG. 3B is a perspective view of an example implementation of an acoustic device using a manifold architecture in a slot configuration, in accordance with one or more embodiments.

FIG. 3B is a perspective view of an example implementation of an acoustic device using a manifold architecture in a slot configuration, in accordance with one or more embodiments. In this configuration, the acoustic device similarly includes a primary waveguide 340 and a manifold 345. The manifold, in this configuration, combines the secondary waveguides into a single channel secondary waveguide 355 with an oval shaped manifold port 350.

It should be noted that the cross section of the primary waveguide, a length of the primary waveguide, lengths of each of the manifold waveguides, port size for the primary waveguide, port sizes for the manifold waveguides, air volume of the manifold, and locations of the manifold waveguides along the primary waveguide, may be selected in part on design requirements of the host device (e.g., headset), and which values results in optimal performance. For example, the device may be designed to maximize the amount of sound pressure waves provided to the microphone compared to the amount of sound pressure waves vented by the manifold, maximize the amount of turbulent pressure waves vented by the manifold compared to the amount of turbulent pressure waves provided to the microphone, and mitigate introducing resonances within an audible range of a human listener.

Figure 4A:
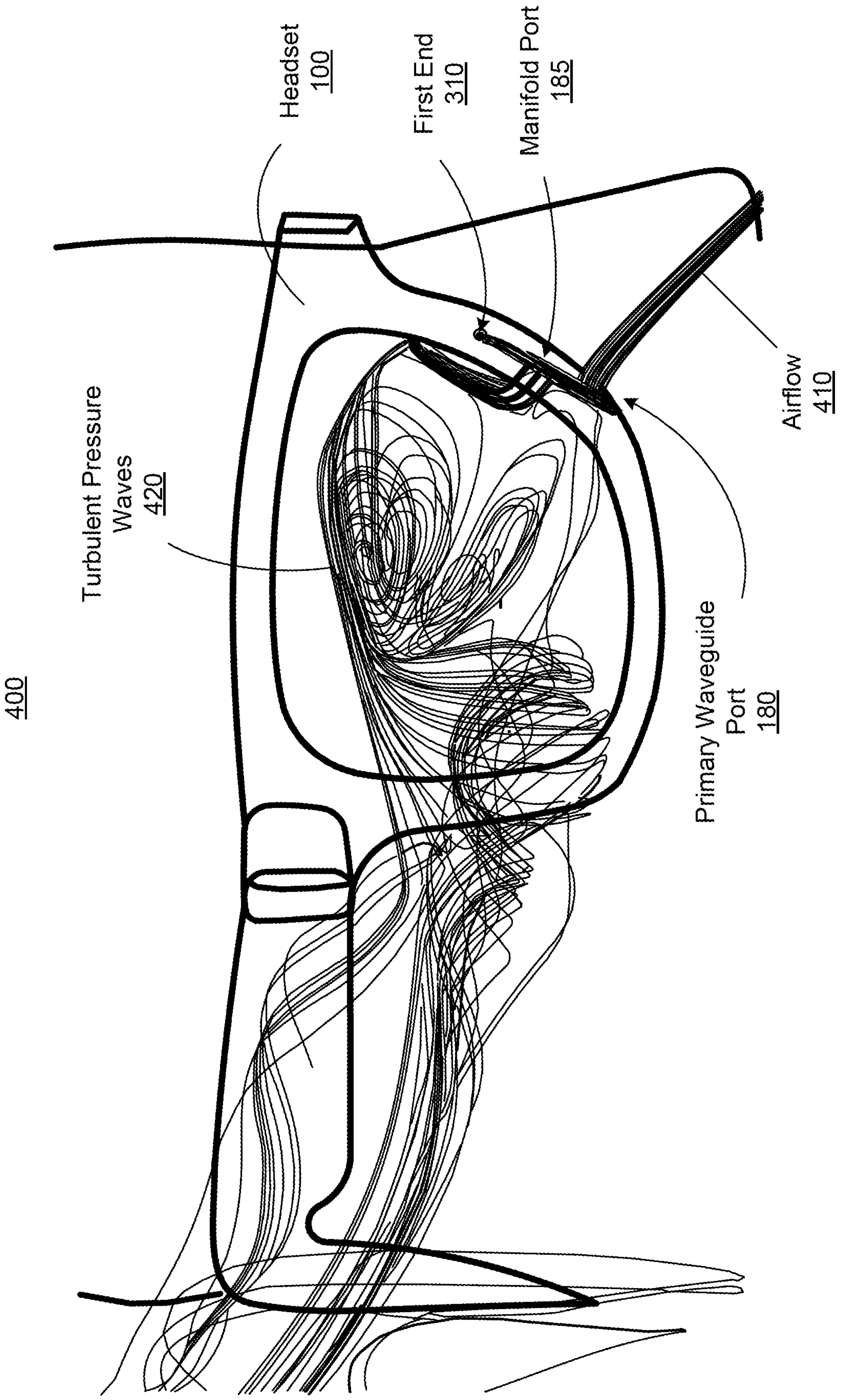
FIG. 4A is a conceptual diagram which illustrates airflow through the acoustic device as implemented in a headset, in accordance with one or more embodiments.

FIG. 4A is a conceptual diagram which illustrates airflow through the acoustic device as implemented in a headset, in accordance with one or more embodiments. The airflow 410 from a local area, which includes sound pressure waves and turbulent pressure waves, enters the acoustic device through the primary waveguide port 180. The primary waveguide directs the sound pressure waves and a first portion of the turbulent waves towards the acoustic sensor, while the manifold vents a second portion of the turbulent pressure waves 420 through the manifold port 185, back into the local area. The second portion of the turbulent pressure waves 420 vented by the manifold is larger than the first portion of the turbulent pressure waves.

In the traditional design, the incoming airflow can only exit from the receiving port, accordingly, most energy is propagated towards the microphone. In contrast, the manifold architecture provides several exit ports for wind to escape through, resulting in less turbulent pressure waves directed to the acoustic sensor. The manifold architecture results in a significant improvement in pressure magnitude reduction compared to the traditional design.

Figure 4B:
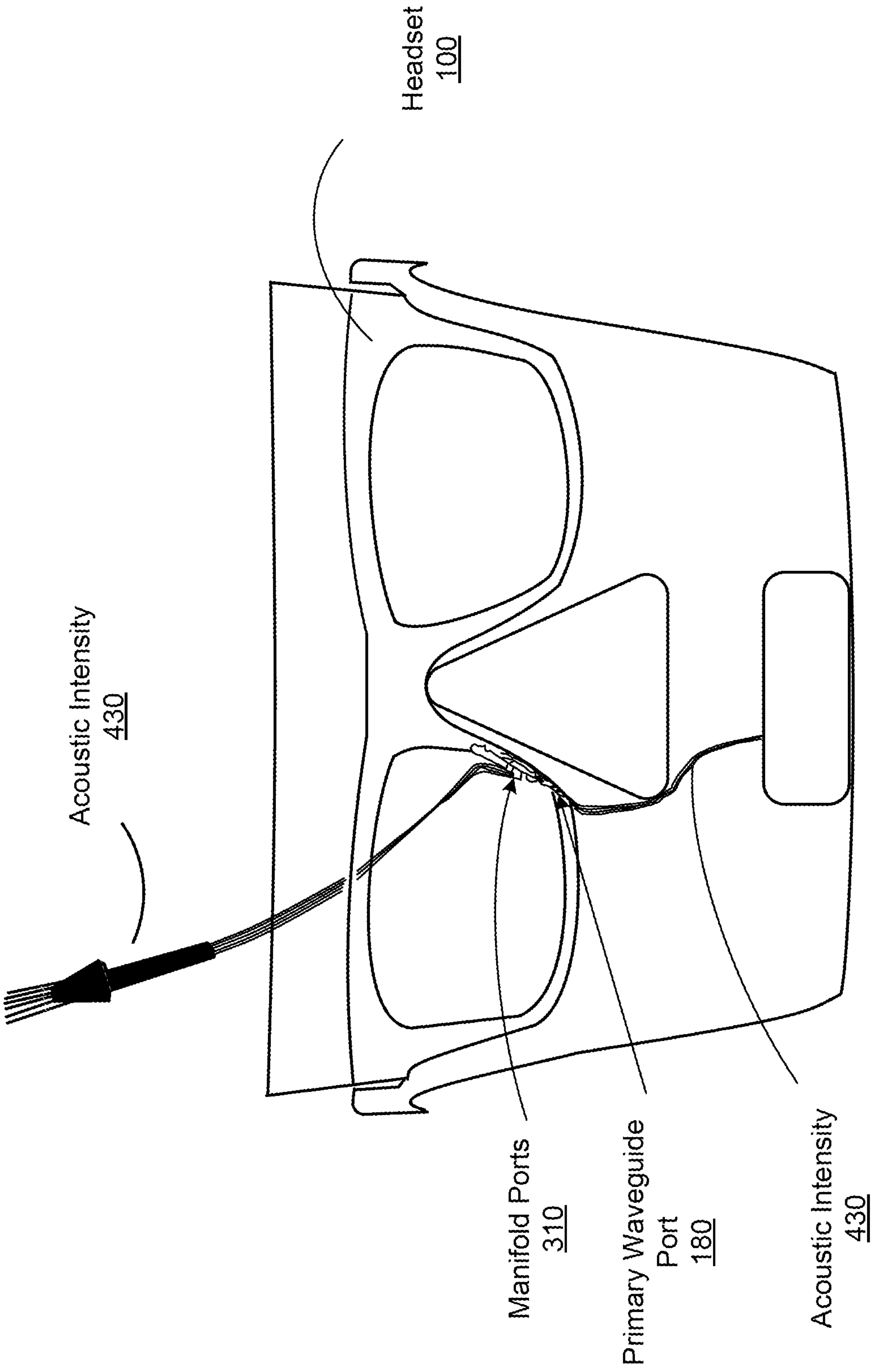
FIG. 4B is a conceptual diagram which illustrates an acoustic intensity of a user's voice while using the acoustic device as implemented in a headset, in accordance with one or more embodiments.

FIG. 4B is a conceptual diagram which illustrates an acoustic intensity of a user's voice while using the acoustic device as implemented in a headset, in accordance with one or more embodiments. The example depicts a near-field acoustic simulation of the acoustic device implemented in a headset, illustrating an acoustic intensity 430 of the user's voice while using the headset 100. Sound pressure waves (i.e., the user's voice) propagate towards the acoustic device in the headset 100. The acoustic device functions as described above.

Figure 5:
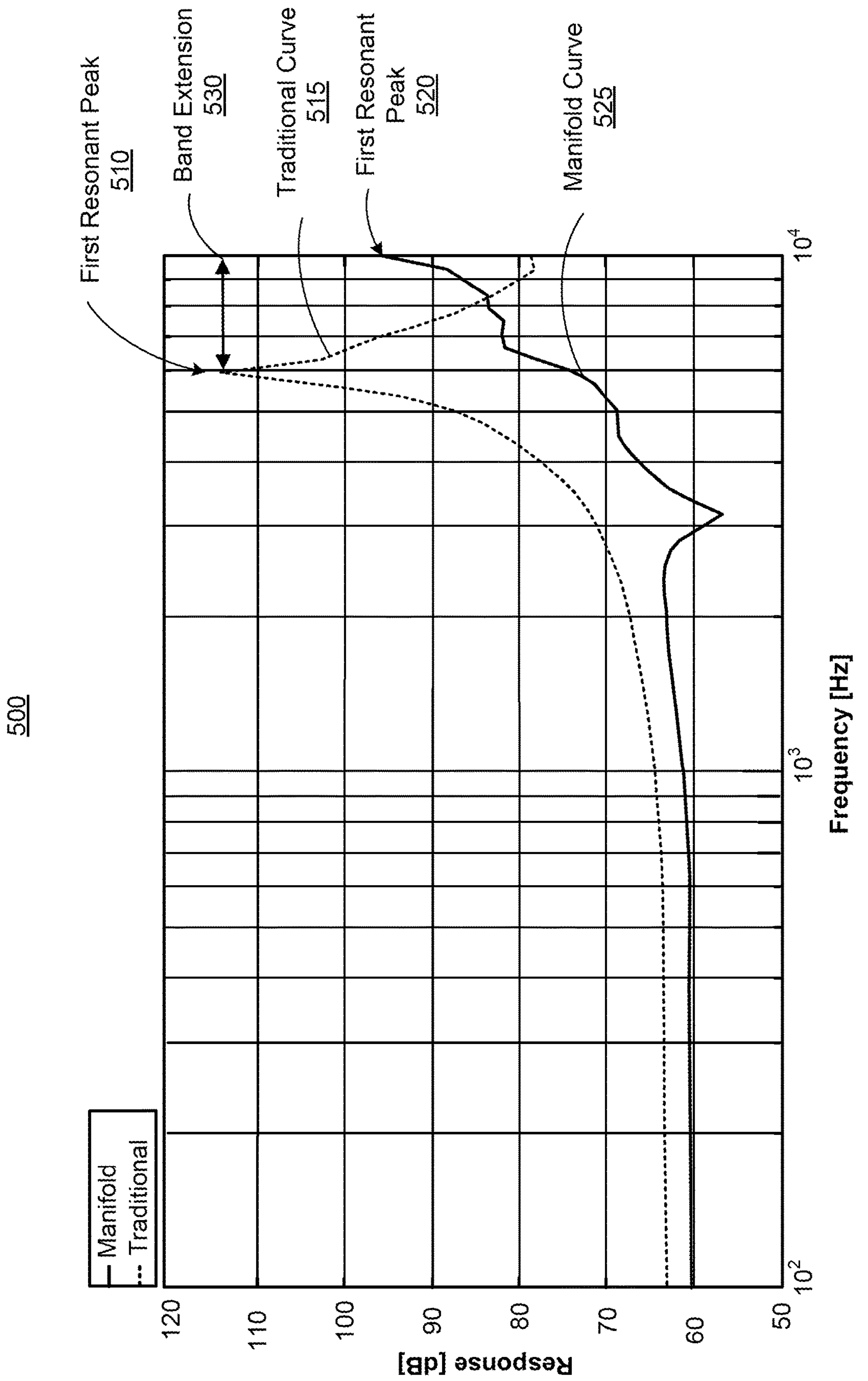
FIG. 5 is a conceptual diagram that illustrates a performance of an acoustic device for near-field voice pick up, in accordance with one or more embodiments.

FIG. 5 is a conceptual diagram that illustrates a performance of an acoustic device with a manifold design for near-field voice pick up, in accordance with one or more embodiments. It should be noted that a waveguide may introduce a resonance into the signal detected at the acoustic sensor. In conventional designs, where acoustic sensors are located at the end of a long tube that is open to a local area, the resonant peak of the acoustic device sits within an audible range of a human listener. This can lead to nonideal effects, such as diminished audio quality and/or triggering additional processing that occurs to minimize the one or more resonances. FIG. 5 includes a graph that includes a first curve 515 that depicts the frequency response of an acoustic device with the traditional design, and a second curve 525 that depicts the frequency response of an acoustic device with the manifold architecture. Referring to FIG. 5, a first resonant peak 510 for the traditional design occurs at 6 kHz due to the lengthy design of the primary waveguide, represented by the dotted curve. The ports of the manifold shorten the open boundary condition to the high impedance boundary condition at the acoustic sensor, allowing the first resonant peak 520 to occur at a higher frequency compared to the traditional design. Integrating the manifold architecture accordingly reduces the length of the primary waveguide, consequently increasing the frequency at which the first resonant peak 520 occurs. Accordingly, the acoustic device with the manifold architecture generates a first resonant peak at a frequency that is approximately 4 kHz higher (i.e., approximately 10.7 kHz) than that of the traditional design, outside of the range of a typical voice communication frequency band (i.e., up to 8 kHz).

Figure 6:
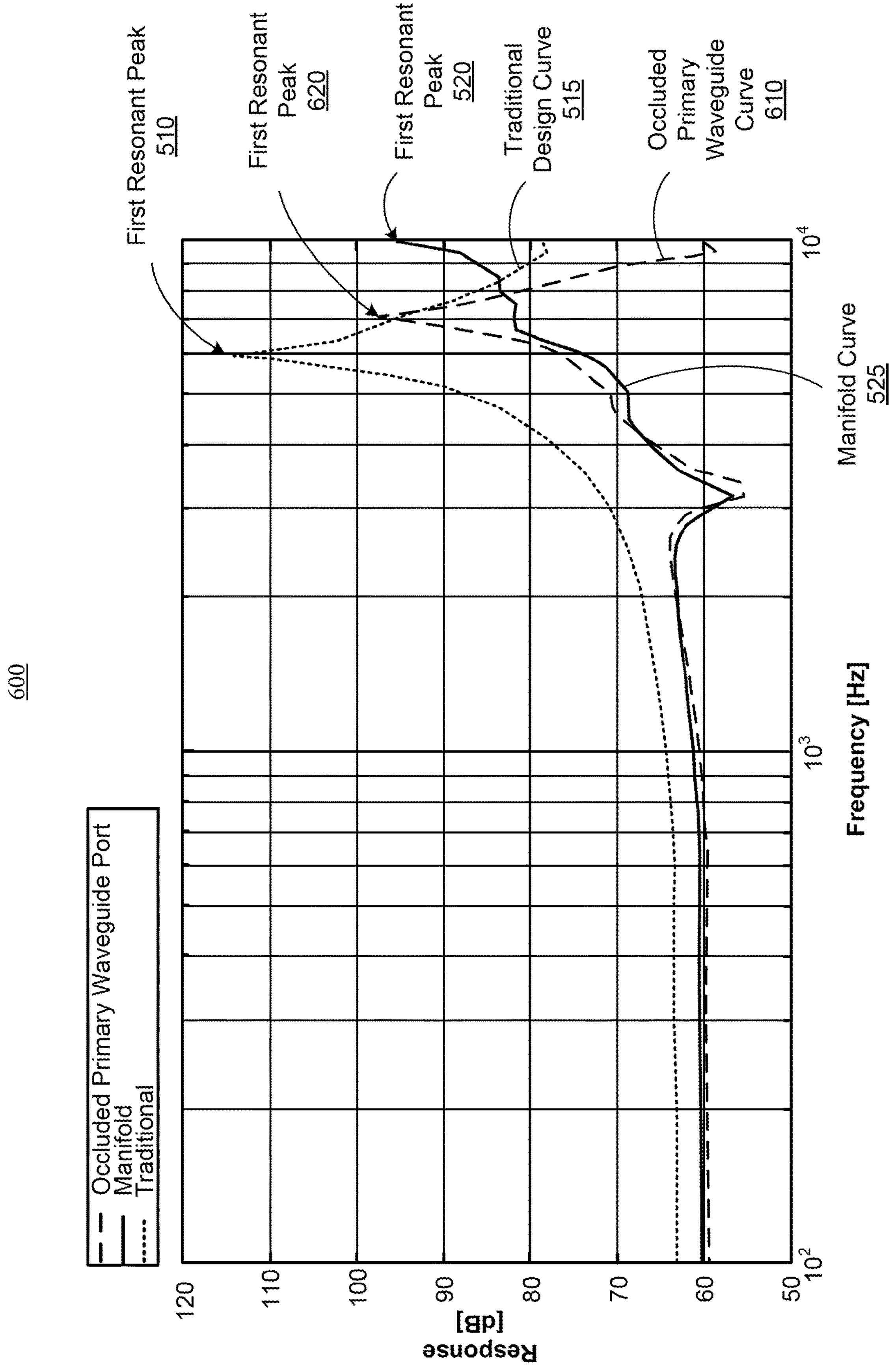
FIG. 6 is a diagram illustrating occlusion reliability of an acoustic device with a manifold architecture, in accordance with one or more embodiments.

FIG. 6 is a diagram illustrating occlusion reliability of an acoustic device with a manifold architecture, in accordance with one or more embodiments. In some embodiments, the port 180 of the primary waveguide or one or more of the manifold ports 185 may be obstructed by debris. An acoustic device with the traditional architecture includes a single port from which sound pressure waves from a local area propagates through and is captured by the acoustic sensor. In such configuration, the debris can obstruct acoustic wave propagation, which may greatly impact the frequency response of the acoustic sensor. For example, if the single port of an acoustic device is fully obstructed by debris, the acoustic sensor may have low output and hence, will not be able to capture voice signals. In contrast, an acoustic device with the manifold architecture includes multiple manifold ports, enhancing the reliability against dust and debris, since the probability of blocking all ports is lower than a single-port conventional design. FIG. 6 includes a graph that includes a first curve 610 that depicts the frequency response of an acoustic sensor with an occluded primary waveguide port, represented by the dashed curve. Additionally, the acoustic device with the manifold architecture, despite having an occluded primary waveguide port outperforms the traditional design by generating a first resonant peak 620 at a higher frequency compared to the first resonant peak 510 generated by the traditional design.

Figure 7:
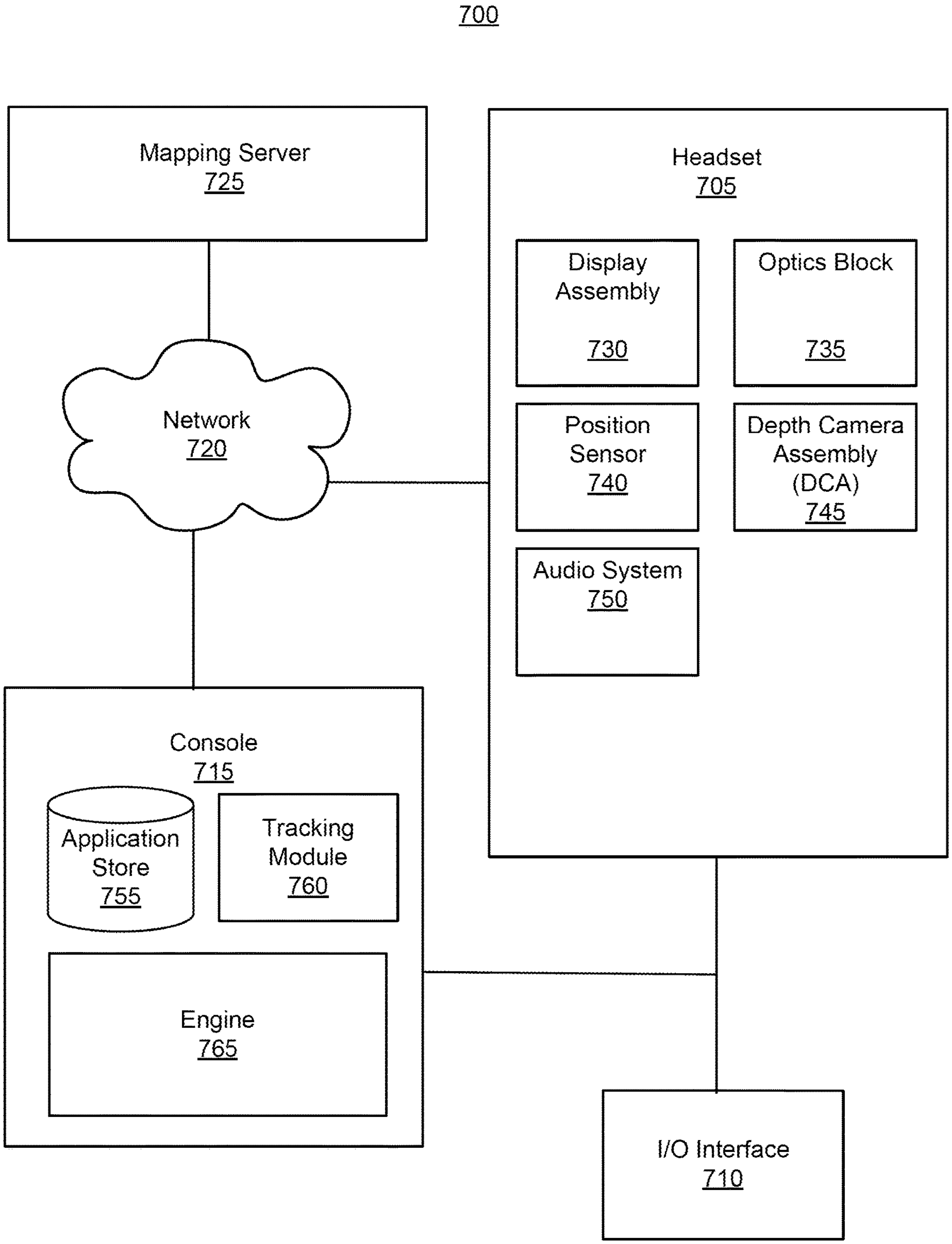
FIG. 7 is a block diagram of a system that includes a headset, in accordance with one or more embodiments.

FIG. 7 is a system 700 that includes a headset 705, in accordance with one or more embodiments. In some embodiments, the headset 705 may be the headset 100 of FIG. 1. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1.

The audio system 750 provides audio content to a user of the headset 705. The audio system 750 is substantially the same as the audio system 200 describe above. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 702.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An acoustic device comprising:

a primary waveguide having a first end and a second end, the first end including an acoustic sensor, and the second end including a port opened to a local area, wherein the primary waveguide is configured to direct airflow from the local area that includes sound pressure waves from a sound source and turbulent pressure waves; wherein the sound pressure waves and a first portion of the turbulent pressure waves are detected by the acoustic sensor; and a manifold including one or more secondary waveguides coupled to a portion of the primary waveguide between the first end and the second end, wherein the one or more secondary waveguides have openings to the local area, and are configured to direct a second portion of turbulent pressure waves away from the acoustic sensor, and wherein the second portion of the turbulent pressure waves is larger than the first portion of the turbulent pressure waves.

2. The acoustic device of claim 1, wherein the one or more secondary waveguides of the manifold each include a first segment and a second segment.

3. The acoustic device of claim 2, wherein the first segment of each secondary waveguide of the manifold further comprises:

a first end, wherein the first end is coupled to an internal opening of the primary waveguide; and a second end, wherein the second end is coupled to an opening of the second segment of the secondary waveguide.

4. The acoustic device of claim 3, wherein the first segment of each secondary waveguide is coupled to the primary waveguide at a an angle.

5. The acoustic device of claim 2, wherein the second segment of each secondary waveguide of the manifold further comprises:

a first end, wherein the first end is coupled to the second end of the first segment of the secondary waveguide; and a second end, wherein the second end opens to the local area.

6. The acoustic device of claim 5, wherein the second segment of each secondary waveguide is coupled to the first segment of the secondary waveguide at an angle.

7. The acoustic device of claim 2, wherein each secondary waveguide of the manifold has a gradually increasing cross-sectional diameter from the first end of the first segment to the second end of the second segment.

8. The acoustic device of claim 1, wherein a total cross-sectional area of the manifold is larger than a cross-sectional area of the primary waveguide.

9. A headset comprising:

a frame;

one or more display elements each coupled to the frame, each display element configured to display content; and an acoustic device coupled to the frame, the acoustic device comprising:

a primary waveguide having a first end and a second end, the first end including an acoustic sensor, and the second end including a port opened to a local area, wherein the primary waveguide is configured to direct airflow from the local area that includes sound pressure waves from a sound source and turbulent pressure waves; wherein the sound pressure waves and a first portion of the turbulent pressure waves are detected by the acoustic sensor; and a manifold including one or more secondary waveguides coupled to a portion of the primary waveguide between the first end and the second end, wherein the secondary waveguides have openings to the local area, configured to direct a second portion of turbulent pressure waves away from the acoustic sensor, and these second portion of the turbulent pressure waves is larger than the first portion of the turbulent pressure waves.

10. The headset of claim 9, wherein the one or more secondary waveguides of the manifold each include a first segment and a second segment.

11. The headset of claim 10, wherein the first segment of each secondary waveguide of the manifold further comprises:

a first end, wherein the first end is coupled to an internal opening of the primary waveguide; and a second end, wherein the second end is coupled to an opening of the second segment of the secondary waveguide.

12. The headset of claim 11, wherein the first segment of each secondary waveguide of the manifold is coupled to the primary waveguide at an angle.

13. The headset of claim 10, wherein the second segment of each secondary waveguide of the manifold further comprises:

a first end, wherein the first end is coupled to the second end of the first segment of the secondary waveguide; and a second end, wherein the second end opens to a local area.

14. The headset of claim 11, wherein the second segment of each secondary waveguide is coupled to the first segment of the secondary waveguide at an angle.

15. The headset of claim 11, wherein the second segment of each secondary waveguide has a gradually increasing cross-sectional diameter from the first end to the second end.

16. The headset of claim 9, wherein a total cross-sectional area of the manifold is larger than a cross-sectional area of the primary waveguide.

17. An audio system comprising:

a sensor array including one or more acoustic devices, an acoustic device comprising:

a primary waveguide having a first end and a second end, the first end including an acoustic sensor, and the second end including a port opened to a local area, wherein the primary waveguide is configured to direct airflow from the local area that includes sound pressure waves from a sound source and turbulent pressure waves; wherein the sound pressure waves and a first portion of the turbulent pressure waves are detected by the acoustic sensor; and a manifold including one or more secondary waveguides coupled to a portion of the primary waveguide between the first end and the second end, wherein the secondary waveguides have openings to the local area, configured to direct a second portion of turbulent pressure waves away from the acoustic sensor, and these second portion of the turbulent pressure waves is larger than the first portion of the turbulent pressure waves; and an audio controller coupled to the sensor array, the audio controller configured to localize one or more sound sources in the local area based on audio captured by the one or more acoustic sensors of the sensor array.

18. The audio system of claim 17, wherein the one or more secondary waveguides of the manifold each include a first segment and a second segment.

19. The audio system of claim 18, wherein the first segment of each secondary waveguide of the manifold further comprises:

a first end, wherein the first end is coupled to an internal opening of the primary waveguide; and a second end, wherein the second end is coupled to an opening of the second segment of the secondary waveguide.

20. The audio system of claim 19, wherein the first segment of each secondary waveguide of the manifold is coupled to the primary waveguide at an angle.

* * * * *